United States Patent [19]
Nakazawa

[11] Patent Number: 5,667,354
[45] Date of Patent: Sep. 16, 1997

[54] TWO-DIMENSIONAL MANIPULATING ROBOT

[75] Inventor: Touji Nakazawa, Sagamihara, Japan

[73] Assignee: Tescon Co., Ltd., Sagamihara, Japan

[21] Appl. No.: 375,367

[22] Filed: Jan. 19, 1995

[30] Foreign Application Priority Data

Feb. 10, 1994 [JP] Japan .................................. 6-016252

[51] Int. Cl.⁶ .................................................. B25J 7/00
[52] U.S. Cl. ........................ 414/744.5; 414/917; 901/8
[58] Field of Search .......................... 414/744.5, 917; 901/15, 21, 23, 8

[56] References Cited

U.S. PATENT DOCUMENTS

| | | | |
|---|---|---|---|
| 4,030,252 | 6/1977 | Price | 414/226 X |
| 4,341,502 | 7/1982 | Makino | 414/744.5 X |
| 4,648,785 | 3/1987 | Nakagawa et al. | 414/744.5 |
| 4,946,337 | 8/1990 | Tonai et al. | 901/21 X |

*Primary Examiner*—Donald W. Underwood
*Attorney, Agent, or Firm*—Nikaido, Marmelstein, Murray & Oram LLP

[57] ABSTRACT

Disclosed is an improved two-dimensional manipulating robot whose arm assemblies are light enough to permit its manipulating hands to move to a desired position quickly with precision. A two-dimensional manipulating robot comprising a base stand, an upper arm pivotally fixed to said base stand at its rear end, a first drive means associated with said upper arm, a forearm pivotally connected to said upper arm at its rear end and having a manipulating hand at its fore-end, a second drive means associated with said forearm, a control for controlling the angular rotation each of said upper arm and said forearm for bringing said manipulating hand to a desired position, is improved according to the present invention in that said second drive means is fixed to said base stand, and that said robot further comprises rotation transmission means to transmit the rotation of said second drive means to said forearm, thereby permitting it to rotate about the fore-end of said upper arm.

3 Claims, 2 Drawing Sheets

FIG. 2
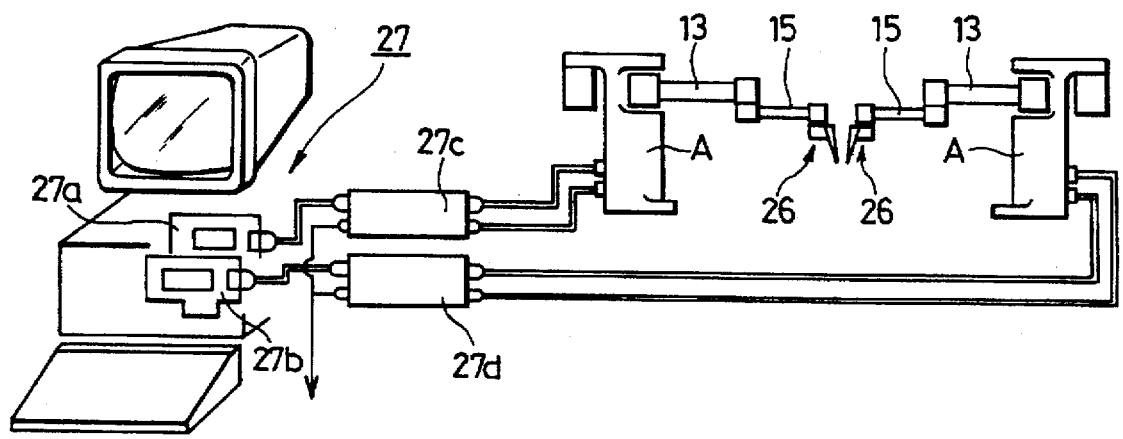
FIG. 3
FIG. 4
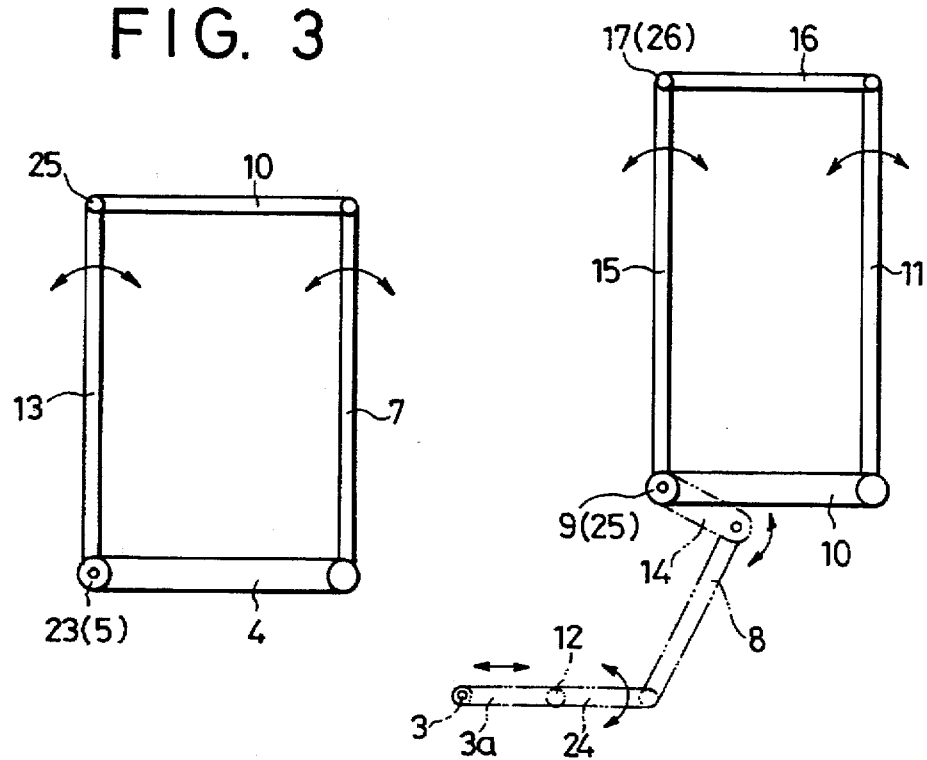

TWO-DIMENSIONAL MANIPULATING ROBOT

BACKGROUND OF THE INVENTION

1. Field of the Invention

The present invention relates to a two-dimensional manipulating robot which is useful in application for surface mount placements, inspection and parts assembling or arrangements.

2. Description of Related Art

For example, in determining which parts or electronic devices are present or absent on printed circuit boards or in effecting required performance tests on selected parts or electronic devices on printed circuit boards, use is made of a two-dimensional manipulator which comprises an X-axial arm and two opposite Y-axial arms slidably attached to the opposite longitudinal sides of the X-axial arm, each of the Y-axial arms having a contact probe slidably attached thereto (see U.S. Pat. No. 5,107,206). The opposite contact probes can be brought to a desired coordinate position by driving the opposite Y-axial arms along the opposite longitudinal edges of the X-axial arm, and by driving the contact probes along the opposite Y-axial arms. The opposite Y-axial arms and the contact probes are driven quickly by associated servomotors through the agency of their rotating screws and nuts.

The X-axial arm supports the Y-axial arms on its opposite, longitudinal edges, and these arms are massive and heavy. Accordingly an increased driving power is required for transportation of each Y-axial arm.

To assure the exact positioning of the contact probes at a selected point in a printed circuit board the arms, guide members and other parts of the manipulator must be made of one and same material of good rigidity because otherwise, the thermal expansions of different parts at the surrounding temperature would cause an adverse effect in positioning the probe pin.

In testing complicated circuit structures two extra guard pins are necessitated, and therefore, four movable heads are required in all. All of these heads must be controlled so as to bring their probe and guard pins simultaneously to a selected small area of square millimeters. The four Y-axial arms equipped with such heads must be so arranged that no interference may be caused therebetween, and accordingly the whole manipulating structure is complicated. These Y-axial arms stand upright from the lying X-axial arm, and accordingly the vertical size of the manipulator is increased. What is worse is the lowered working efficiency caused by an increased force of inertia of the massive Y-axial arms, which prevents the movable parts from moving at an increased speed and high accuracy.

Therefore, there has been an increasing demand for a two-dimensional manipulator whose moving parts have decreased force of inertia small enough to assure the quick and accurate movement of contact probes (manipulating hands) and accordingly improve the working efficiency.

SUMMARY OF THE INVENTION

One object of the present invention is to provide a two-dimensional manipulator whose moving parts are simple and light enough to assure the quick and accurate movement of manipulating hand(s) to attach to its arm(s) and the improved working efficiency.

To attain this object a two-dimensional manipulating robot comprising a base stand, an upper arm pivotally fixed to said base stand at its rear end, a first drive means associated with said upper arm, a forearm pivotally connected to said upper arm at its rear end and having a manipulating hand at its fore-end, a second drive means associated with said forearm, a control for controlling the angular rotation each of said upper arm and said forearm for bringing said manipulating hand to a desired position, is improved according to the present invention in that said second drive means is fixed to said base stand, and that said robot further comprises rotation transmission means to transmit the rotation of said second drive means to said forearm, thereby permitting it to rotate about the fore-end of said upper arm.

This arrangement has the effect of reducing the force of inertia of the arm assembly having a manipulating hand, thereby assuring the quick transport of the manipulating hand to a desired position with precision. Accordingly the working efficiency of the manipulating robot is improved.

The base stand may have a pair of arm assemblies pivotally fixed thereto, each arm assembly being composed of said upper arm, said first drive means, said forearm, said second drive means, and said rotation transmission means.

This arrangement has the effect of preventing the interference between the manipulating hands moving at increased speed simply by programming in the common control.

The rotation transmission means may comprise rotatable levers and connection rods in combination.

This has the effect of decreasing the weight of the arm assembly, assuring the reliable transmission of rotation from the second drive means to the manipulating hand.

Each of said upper arm and forearm may be a linked parallelogram structure, and said upper arm and forearm may be so operatively connected that the posture or orientation of said manipulating hand may remain unchanged, independent of the rotational displacement of each of said upper arm and forearm.

This has the effect of facilitating the programming of the manipulating work because of permitting the programming of moving parts without taking no account of the varying posture or orientation of the manipulating hand.

A pair of arm assemblies may be arranged in opposing relation, said control associated with each arm assembly controlling the rotation each of said first and second drive means so that the manipulating hands may not interfere with the other.

This arrangement has the effect of avoiding any interference between the four manipulating hands simply by a common control. Also advantageously the whole size of the manipulating system can be reduced.

Other objects and advantages of the present invention will be understood from the following description of a preferred embodiment of the present invention.

BRIEF DESCRIPTION OF THE DRAWINGS

FIG. 2 shows diagrammatically the control of the manipulating robot;

FIG. 3 shows a linked parallelogram structure of the upper arm of an arm structure in the manipulating robot; and FIG. 4 shows a linked parallelogram structure of the forearm of the arm structure in the manipulating robot.

DESCRIPTION OF THE PREFERRED EMBODIMENTS

Figure 1:
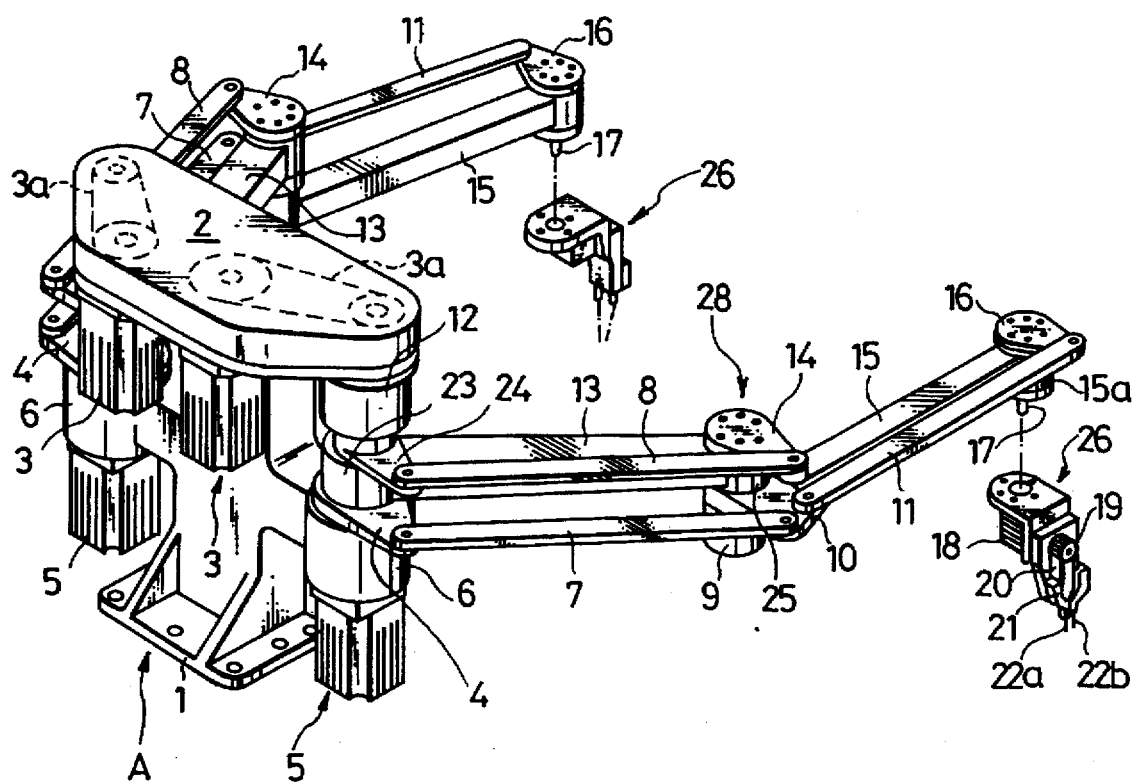
FIG. 1 is a perspective view of a manipulating robot according to the preferred embodiment of the present invention.

Referring to FIGS. 1 and 2, a two-arm robot A comprises a base stand 1, two upper arms 13 each pivotally fixed to the base stand 1 at its rear end, two first drive means or motors 5 each associated with each upper arm 13, two forearms 15 each pivotally connected to the upper arm 13 at its rear end and having a manipulating hand 26 at its fore-end, two second drive means or motors 3 each associated with each forearm 15, a control 27 for controlling the angular rotation of each upper arm and forearm for bringing each manipulating hand to a desired position. The second motors 3 are fixed to the base stand 1, and the robot further comprises rotation transmission means 28 to transmit the rotation of each second motor 3 to the associated forearm 15, thereby permitting it to rotate about the fore-end of the associated upper arm 13.

The base stand 1 is made of a metal of high resistivity, such as aluminum alloy, iron or steel.

The first motors 5 are fixed to the base stand 1 with their shafts extending vertically, connected to an associated boss 23 via a speed-reduction gearbox 6, thereby permitting the boss 23 to rotate a controlled angle at a reduced speed.

The upper arm 13 in the form of rod is integrally connected to the boss 23 to rotate in the same direction as the boss 23.

The upper arm 13 has a cylindrical bearing 25 fixed to its fore-end, and a connecting piece 10 is connected to a pivot axle which is rotatably fitted in the bearing 25. The pivot axle has a lever 14 and a boss 9 fixed to its opposite ends. Thus, the lever 14 and the boss 9 can rotate simultaneously in same direction.

A stationary piece 4 intervenes between the boss 23 and the gearbox 6, and is bolted to the gearbox 6. A connecting rod 7 is rotatably jointed to the stationary piece 4 and the connecting piece 10, thus providing an articulated parallelogram structure, which is composed of the upper arm 13, the connecting rod 7, the stationary piece 4 and the connecting piece 10 as shown in FIG. 3. A given angular rotation of the boss 23 in one direction will cause the upper arm 13 to sway in the same direction, thus swaying the connecting rod 7 and shifting the connecting piece 10 while keeping parallel with the stationary piece 4.

The forearm 15 is integrally connected to the boss 9, and the forearm 15 has a cylindrical bearing 15a at its fore-end. A rotatable shaft 17 passing through the bearing 15a has a connecting piece 16 and a manipulating hand 26 fixed to its opposite ends. The connecting piece 16 and the manipulating hand 26 can rotate simultaneously. A connecting rod 11 is linked to the connecting pieces 10 and 16.

As shown in FIG. 4, an articulated parallelogram structure is composed of the forearm 15, the connecting rod 11, the connecting piece 10 and the connecting piece 16. A given angular rotation of the boss 9 in one direction will cause the forearm 15 to sway simultaneously in the same direction, thus swaying the connecting rod 11 and shifting the connecting piece 16 while keeping parallel with the connecting piece 10.

Rotation transmission means 28 to transmit the rotation of the second motor 3 to the boss 9 comprises an endless belt 3a, a speed-reduction gearbox 12 which reduces the rotating speed of a toothed pulley driven by the endless belt 3a, a rotatable lever 24 whose rear end is fixed to the output shaft of the gearbox 12 and a connecting rod 8 linked both to the fore-end of the rotatable lever 24 and the fore-end of the lever 14, as seen from FIGS. 1 and 4.

Whether one or both of the upper arm 13 and the forearm 15 are rotated in the manipulating robot A, the connecting pieces 10 and 16 remain parallel to each other, and the connecting piece 10 and the stationary lever 4 remain parallel to each other, and therefore, the connecting piece 16 and the stationary lever 4 remain parallel to each other. As a result the manipulating hand 26 which is fixed to the rear end of the connecting piece 16 via its rotatable axle 17 can keep its posture oriented to a predetermined direction while moving in its two-dimensional working area.

As seen from FIG. 1, the manipulating hand 26 comprises a block 21 having two contact pins 22a and 22b, and a motor drive 18 having an endless belt 20 and associated pulley 19. Another manipulating hand appropriate for the purpose may be selected and fixed to the rotatable axle 17.

Referring to FIG. 2, the control 27 comprises, in a computer body, a programmable, central processing unit, I/O (input/output) interface units 27a and 27b, and servo-controls 27c and 27d. Two two-arm robots A are so controlled that the four manipulating hands 26 of these robots may be engaged in four-terminal measurements (two input terminals and two output terminals) of electronic devices or parts.

The manner in which each manipulating robot is used is described below with reference to FIG. 2, where a two-arm manipulating robot is arranged to face a counter two-arm manipulating robot, thus providing a four-arm robot system.

The first and second motors 5 and 3 of each robot are responsive to command signals from the control 27 for making controlled angular rotations via the servo-controls 27c and 27d according to a given program. Sometimes both of the first and second motors 5 and 3 are simultaneously rotated, and sometimes one of these motors are selected and rotated.

Assume that the first motor 5 is rotated in one direction, thereby rotating the boss 23 at a reduced speed. At the same time the upper arm 13 is rotated a selected angle about the pivot of the boss 23 in the same direction.

Assume that the second motor 3 is rotated in one direction, transmitting the rotation of the second motor 3 to the rotatable lever 24 via an associated toothed-pulley, an endless belt 3a and another toothed-pulley, and then via the speed-reduction gearbox 12 thereby to rotate the rotatable lever 24 at a reduced speed in one direction. The rotation of the rotatable lever 24 is transmitted to the connecting piece 14 via the connecting rod 8, thus rotating the connecting piece 14 in one direction.

Then, the boss 9 which is fixed to the connecting piece 14 via the rotatable axle of the bearing 25, is rotated in one direction. As a result the forearm 15 extending from the boss 9 is rotated about the pivot axle of the bearing 25.

The upper-arms and forearms 13 and 15 of each robot are rotated given angles of rotation in one direction under the influence of the control 27 so that all four manipulating hands 26 may be moved at an increased speed without fear of interference in a two-dimensional area, keeping their postures oriented to predetermined directions.

The arm assembly is composed only of an upper arm 13, a forearm 15 and rotation transmitting means 28, and therefore, the arm assembly is light, and accordingly the force of inertia of the arm assembly in rotating is so small that the first and second motors can bring the arm assembly quickly to a desired position with precision.

The four-arm manipulating robot system comprising two two-arm robots arranged face-to-face can be used in four-terminal measurements of electronic devices on printed circuit boards, making a decision as to a selected printed circuit should be passed or rejected.

Each second motor 3 may be directly connected to the gearbox 12 without using the endless belt and associated pulleys if extra space is available. As for rotation transmitting means a first pulley may be used in place of the connecting piece 24, and a second pulley may be used in place of the connecting piece 14. Then, an endless wire runs around these first and second pulleys. Alternatively an endless belt may be used to run around two toothed-pulleys.

I claim:

1. A two-dimensional manipulating robot comprising a base stand having a pair of arm assemblies pivotally fixed thereto, each arm assembly being composed of an upper arm pivotally fixed to said base stand at its rear end, a first drive means connected to said upper arm for rotating said upper arm, a forearm pivotally connected to said upper arm at its rear end and having a manipulating hand at its fore-end, a second drive means connected to said forearm and fixed to said base stand for rotating said forearm, a control connected to the first drive means and second drive means for controlling the angular rotation of each of said upper arm and said forearm for bringing said manipulating hand to a desired position, and rotation transmission means connected between the forearm and the second drive means to transmit the rotation of said second drive means to said forearm comprising rotatable levers having connection rods rotatably connected thereto, wherein each of said upper arm and forearm is a linked parallelogram structure comprising longitudinal and transverse levers, and wherein a proximal transverse lever of the upper arm is fixed and a distal transverse lever of the forearm supports the hand so that said upper arm and forearm are connected wherein a position of said manipulating hand remains independent of the rotational displacement of each of said upper arm and forearm.

2. A two-dimensional manipulating robot according to claim 1, wherein said pair of arm assemblies are arranged in opposing relation, said control associated with each arm assembly controlling the rotation of its respective said first and second drive means so that the manipulating hands may not interfere with the other.

3. A two-dimensional manipulating robot according to claim 1, wherein said pair of arm assemblies are arranged in opposing relation, said control associated with each arm assembly controlling the rotation of its respective said first and second drive means so that the manipulating hands are controlled in a non-interfering manner.

* * * * *